April 7, 1964 N. GOTTLIEB 3,127,810
OPTICAL PROJECTOR LENS SYSTEMS
Filed Nov. 25, 1960 2 Sheets-Sheet 1

INVENTOR
NATHAN GOTTLIEB
BY
Herbert C. Kimball
ATTORNEY

April 7, 1964   N. GOTTLIEB   3,127,810
OPTICAL PROJECTOR LENS SYSTEMS
Filed Nov. 25, 1960   2 Sheets-Sheet 2

INVENTOR
NATHAN GOTTLIEB
BY Herbert C. Kimball
ATTORNEY

United States Patent Office 3,127,810
Patented Apr. 7, 1964

3,127,810
OPTICAL PROJECTOR LENS SYSTEMS
Nathan Gottlieb, Buffalo, N.Y., assignor to American Optical Company, Southbridge, Mass., a voluntary association of Massachusetts
Filed Nov. 25, 1960, Ser. No. 71,801
2 Claims. (Cl. 88—24)

This invention relates to optical projectors known as optical comparators, which are used in industry for providing on a screen a magnified image of an object or workpiece. Where the lighting falling upon the workpiece is such that the profile of the workpiece stands out on the screen, the instrument is known as a profile projector.

An object of the present invention is to improve the optical system of such a comparator. There is a demand for a range of magnifications in such an instrument; and the usual practice is to provide for replacement of a part of the optical system by a substitute part of different magnifying power. For instance, as disclosed in the Turner and Kingslake Patent 2,552,238 issued May 8, 1951, a relay lens system is employed in which the first stage produces an aerial image of which a magnified image is thrown on the screen by the second stage. According to the disclosure of this patent the desired range of magnifications is provided by mounting on a rotatable turret a series of magnifying objectives, any one of which can be swung into position to function as the second stage of the relay lens system.

An objectionable feature of the use of a number of magnifying objectives is the cost. These objectives used for the second stage of the relay system should be well corrected and accordingly are expensive if an accurate image is to be obtained.

In accordance with my invention which also employs a relay lens system, the well corrected objective for projecting the image on the screen is not replaced for obtaining a change in magnification. Instead I arrange for replacement or interchange of optical elements which produce the aerial image with the purpose of varying the size of this aerial image. This means that but one of the well corrected objectives is required instead of the plurality mounted on the turret of the Turner and Kingslake patent. I change the magnification of the image on the screen by replacing or interchanging optical elements which are considerably less expensive than the above mentioned well corrected objectives, as will now be explained.

Referring to the drawings.

Figure 1:
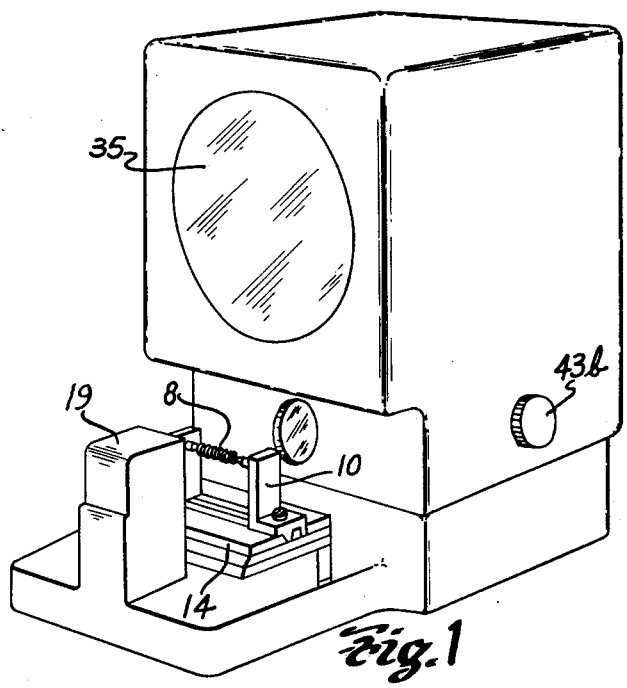
FIG. 1 is a perspective view of an optical comparator of the type to which my invention is adapted.
Figure 2:
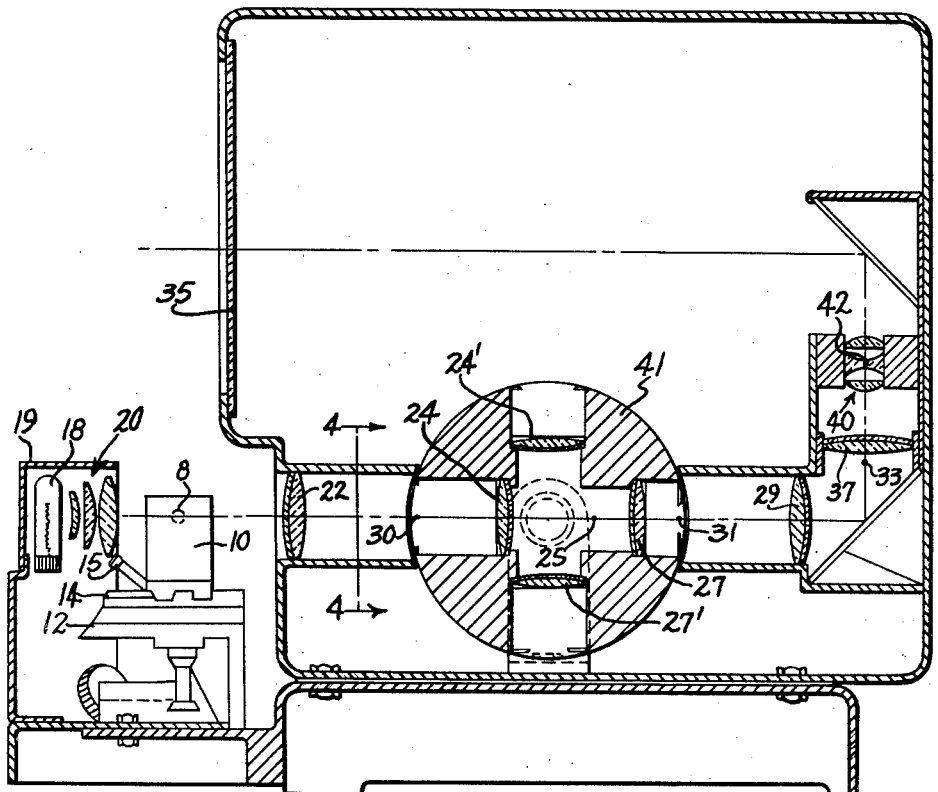
FIG. 2 is a view principally in vertical section through the optical axis of the contour projector shown in FIG. 1.

As shown in FIGS. 1 and 2, the object or workpiece 8 is carried by a work holder 10. The construction of this work holder forms no part of my invention. It may be furnished if desired with adjustments for bringing into the field of the projection system the exact portion of the workpiece which is to be scrutinized. For instance, the table 12 of the work holder may be raised and lowered by screw mechanism not shown, and may be furnished with a slide 14 which is moved transversely of the table by mechanism 15 which moves up and down with the table 12.

The type of illumination used determines whether the instrument permits episcopic examination of the surface of the object 8 or whether it is the profile of the object or workpiece 8 which is thrown on the screen. It is the profile type of instrument which has been selected for illustration in the drawings, and accordingly parallel light (see also FIG. 3) is used. For this purpose a lamp 18 is mounted in a lamphouse 19 with which cooperates a condenser lens 20. Light rays issuing from the lamphouse 19, after passing through the condenser lens 20 are substantially parallel, and therefore an image of the filament of lamp 18 is formed at the back focal plane 30 of the first lens 22 of the optical system of the comparator.

This parallel light illuminates in particular the profile of the workpiece 8 and an image of this profile is projected on the screen 35 of the comparator. It will be readily appreciated, however, that if the illumination were so directed as to fall on the face of the object which is toward the optical system, the projection would be episcopic projection. My improved optical projection system may be used with either type of illumination, and my invention is not to be limited to either type.

My improved optical system constitutes a relay system in three stages, the first and second stages being telecentric systems which successively form first and second aerial images of the object and then relay this second aerial image to the third stage which projects the relayed image on the screen.

The first stage of my optical system consists of two positive lenses 22 and 24 separated by the sum of their focal lengths. Accordingly, with the table 12 so arranged that the workpiece 8 is at the front focal plane of lens 22, an aerial image of the workpiece is formed in the back focal plane 25 of lens 24.

The second stage of my optical system consists of two positive lenses 27 and 29 separated by the sum of their focal lengths, and this second stage is spaced from plane 25 by the front focal length of lens 27. It will be apparent therefore, that an image of the filament of lamp 18 is formed at 30, the back focal plane of lens 22 as above stated; and a second image thereof is formed at 31, the back focal plane of lens 27. Accordingly, the combined stages 22, 24 and 27, 29 will be telecentric on the object side and also on the image side of the focal plane 25.

The second stage receives light from the aerial image formed at 25 and forms a second aerial image in the back focal plane 33 of lens 29. The third stage which projects this relayed image on the screen 35 may be any suitable projection system which will receive light from the aerial image at 33 and project an image which is comparatively free from distortion on the screen 35. For this purpose I prefer to use a field lens 37 cooperating with a well corrected objective such as the triplet illustrated at 40. The focal length of the field lens 37 is preferably so chosen that the aperture stop of the objective 40 coincides with the back focal plane 42 of the field lens 37.

As stated above, my invention contemplates use of the objective 40 throughout the range of magnifications of which the instrument is capable. It is the aerial image at 33 which is caused to vary in size depending upon the amount of magnification desired.

Figure 3:
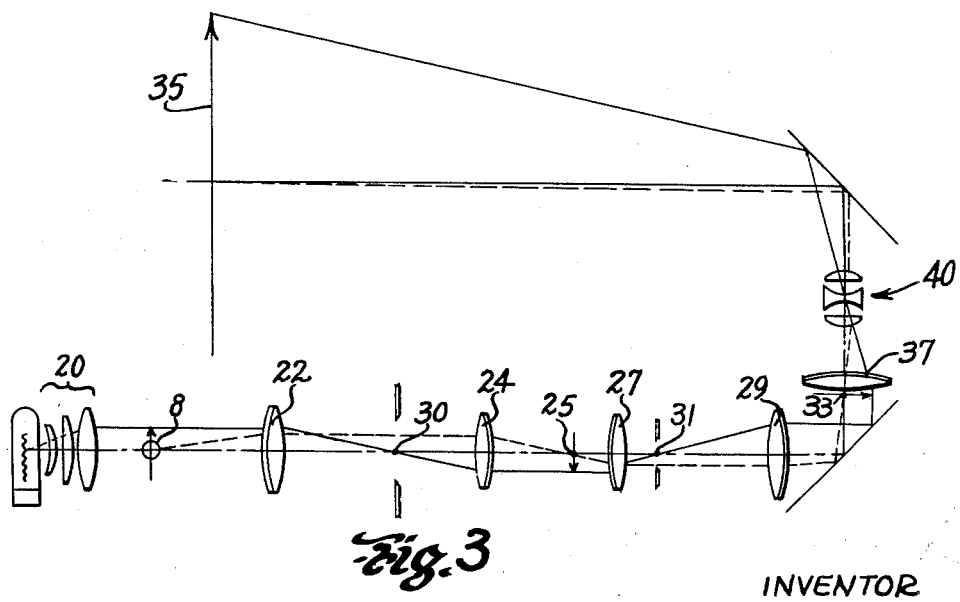
FIG. 3 shows the optical system of the contour projector.
Figure 4:
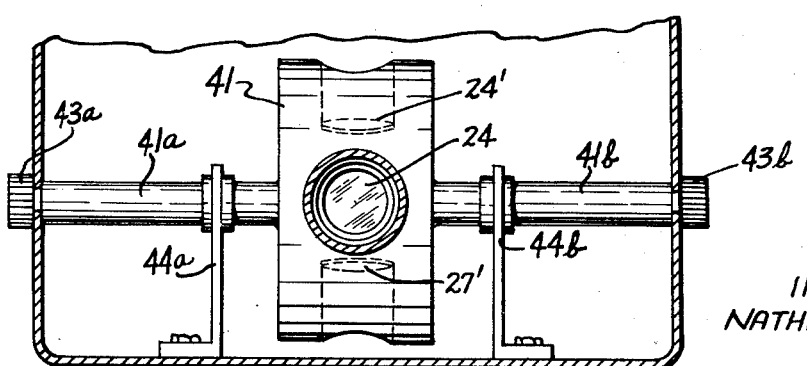
FIG. 4 is a fragmentary view principally in elevation and looking in the direction of the arrows in FIG. 2.

To permit a change in the size of the aerial image at 33, the lenses 24 and 27 are so mounted that they may be replaced or interchanged (see FIGS. 2, 3 and 4). It will make it easier to understand the effect of such a replacement or interchange if for the moment the theoretical situation is assumed that the lenses 24 and 27 are removed altogether, and accordingly, the light passing from lens 22 to lens 29 consists of bundles of parallel light. Accordingly, the separation between lenses 22 and 29 is immaterial (except as it affects the telecentric character of the system) and an object at the front focal plane of lens 22 will give rise to an (aerial) image at 33, the back focal plane of lens 29. Assuming that $f_{22}$ is the focal length of lens 22 and $f_{29}$ is the focal length of lens 29, the magnification effected by this theoretical system is $f_{29}/f_{22}$ (neglecting sign).

Again assuming that $f_{24}$ and $f_{27}$ are the respective focal lengths of lenses 24 and 27, we know that because the lenses 24 and 27 are separated by the sum of their focal lengths and therefore, constitute a telescope, the magnification introduced by this telescopic system is $f_{24}/f_{27}$ (neglecting sign). Obviously, if this telescope is inserted between lens 22 and lens 29 the magnification of the workpiece 8 as imaged at 33 is $(f_{19}/f_{22})(f_{24}/f_{27})$. It will be noted that the separation between lens 22 and lens 24 does not enter into the computation of this magnification. Accordingly, a multiplicity of desired magnifications of the workpiece as imaged at 33 can be obtained by replacing the telescopic system 24, 27 by other telescopic systems of suitable magnification.

Furthermore, if the telescopic system 24, 27 be changed end for end so that the order of the lenses becomes 22, 27, 24, 29, the magnification obtained by this inverted telescopic system is changed from $f_{24}/f_{27}$ to $f_{27}/f_{24}$. This doubles the usefulness of the telescopic system 24, 27.

A further advantage of reversing the position of the telescopic system 24, 27 is that the converted system 22, 27, 24, 29 remains telecentric. In explanation, it should be noted that the entrance pupil of the telescopic system 24, 27 is located in the front focal plane of lens 24, and the exit pupil is located in the back focal plane of lens 27. The chief rays are parallel to the optical axis between lens 24 and lens 27. If the telescopic system 24, 27 is rotated about an axis 44 which is midway between the entrance and exit pupils, then the system 22, 24, 27, 29 which is telecentric is converted to the system 22, 27, 24, 29, which provides a different magnification, but remains telecentric.

A still further advantage of reversing the position of the telescopic system 24, 27 is that in both relations the first stage constitutes a hemi-symmetrical system and the second stage likewise constitutes a hemi-symmetrical system with the resultant freedom from distortion, a feature which is vital in an optical comparator. Thus my invention affords a way of changing the magnification in a relay system while maintaining a telecentric stop and at the same time utilizing a hemi-symmetrical system for both of the first two stages of the system.

By way of illustration, I will give specifications of an optical comparator of the type shown in FIG. 3 as a specific embodiment of my invention. The showing of condenser lens 20 in this figure is conventional, because this lens meets the requirements of my invention provided the light rays issuing therefrom are substantially parallel. The first stage of my relay system consists of two positive lenses 22 and 24, both of which are preferably doublets. The second stage likewise consists of two positive lenses 27 and 29 both of which are preferably doublets. The showing of the field lens 37 and of the objective 40 is also conventional because these lenses meet the requirements of my inventional provided the objective 40 is well corrected and has its aperture stop substantially coincident with the back focal plane of the field lens 37.

For the lens 22 I have chosen a focal length of seven inches, for the lens 24 a focal length of five inches, for the lnes 27 a focal length of two inches and for the lens 29 a focal length of seven inches. For such a combination of telescopic systems it is well to select an objective 40 having a magnification of twenty-five times. With the lenses of the first two stages arranged in the order 22, 24, 27, 29, the aerial image at 33 has a magnification of $\frac{7}{7} \times \frac{5}{2} = 2.5$; and the total magnification (on the screen 35) is $2.5 \times 25 = 62.5$ times. If lens 24 and 27 are now interchanged, the aerial magnification is $\frac{7}{7} \times \frac{2}{5} = .4$; and the screen magnification is 10 times.

It should be noted here that in practice the instrument would have diaphragms in the back focal plane 30 of lens 22 and in the back focal plane 31 of lens 27. The apertures of these diaphragms would be proportional to the focal lengths of the enclosed lenses 24 and 27. If the focal length of lens 24 is five inches and the focal length of lens 27 is two inches, the aperture at 30 would have a diameter 2 and ½ times the diameter of the aperture at 31.

When providing a different magnification by replacing the telescopic system 24, 27 by another such telescopic system 24', 27', the length from the back focal plane 30 of lens 22 to the back focal plane 31 of lens 27 should be kept as standard. That is to say $2f_{24}+2f_{27}=14$ is the measurement of this length for the telescopic system 24, 27 and the same formula should apply to the substituted telescopic system 24', 27'. Let $f_B$ be the focal length of the new lens 24' and $f_C$ be the focal length of the new lens 27'. Then, according to the above formula $2f_B+2f_C=14$. If as is desirable, the ratio of $f_B$ to $f_C$ is selected as 1.25, then $f_B=3.8889$ and $f_C=3.111$. With the lenses 24', 27' arranged in the original order, the magnification of the aerial image is $\frac{7}{7} \times 1.25 = 1.25$ and the screen magnification (using the same objective of 40 as previously) is 31.25 times. With the lenses 27', 24' reversed their magnification is the reciprocal of 1.25 so that the formula for the magnification of the aerial image becomes $$\frac{7}{7} \times \frac{1}{1.25} = .8$$

and this means that the screen magnification is calculated as $.8 \times 25 = 20$ times. Here again the apertures of the diaphragms would be proportional to the focal lengths $f_B$ and $f_C$. In other words the aperture adjacent the lens 24' would have a diameter 1.25 times the diameter of the aperture adjacent the lens 27'. The particular arrangement for replacing or interchanging the lenses 24 and 27 is not of great importance to my invention. One construction which may be used is shown in FIGS. 2 and 4, and includes a turret 41 mounted on a horizontal axis and supported by two axles 41a and 41b. Each axle carries a knob 43a or 43b on the outside of the housing of the comparator whereby the turret 41 may be turned. The axles 41a and 41b are rotatably mounted in trunnions 44a and 44b. The turret 41 may for convenience in construction or operation be mounted for rotation about a vertical axis instead of as shown.

It will be apparent therefore that by means of my invention it is possible to set the optical comparator for an original magnification of say 62.5 times, then by merely reversing the telescopic system 24, 27 to set the comparator for a magnification of 10 times; and furthermore by substituting a different telescopic system 24', 27' it is possible to obtain either a magnification of 31.25 times or a magnification of 20 times. These four magnifications on the screen are obtained without a substitute for the relatively expensive objective 49 and without any alteration in its position once it is adjusted into accurate focus. The lenses 24, 27 which are replaced are relatively inexpensive, and considerable economy is therefore possible in providing an optical comparator with a highly desirable range of magnifications.

I claim:

1. An optical relay lens system for use in an optical comparator having a viewing screen, a work holder, and means for illuminating a work piece on said work holder, said relay lens system being adapted to provide a magnified image of said work piece on said viewing screen and comprising a first telecentric system consisting of first and second positive lenses separated from each other a distance equal to the sum of their respective focal lengths, said telecentric system being arranged to receive light from said work piece and to form a first aerial image thereof, a second telecentric system aligned with said first telecentric system and consisting of third and fourth positive lenses separated from each other a distance equal to the sum of their respective focal lengths, said second telecentric system being arranged to receive light from said first aerial image and to form a second aerial image thereof, and a projection objective optically aligned with said second telecentric system and arranged to receive light from said second aerial image and to project an enlarged image thereof onto said viewing screen, said second positive lens of the first telecentric system and said third positive lens of said second telecentric system being contained in common mounting means and together forming a telescopic optical system adapted to provide a predetermined magnification for the projected image of said work piece on said screen, and said common mounting means containing said second and third positive lenses being removable as a unit from said relay system so as to permit insertion of a different common mounting means containing a different pair of positive lenses which together function as a telescopic optical system of different power and which function in said relay system as components of said first and second telecentric systems to yield a different predetermined magnification for the projected image on said screen.

2. An optical relay lens system for use in an optical comparator having a viewing screen, a work holder, and means for illuminating a work piece on said work holder, said relay lens system being adapted to provide a magnified image of said work piece on said viewing screen and comprising a first telecentric system consisting of first and second positive lenses separated from each other a distance equal to the sum of their respective focal lengths, said telecentric system being arranged to receive light from said work piece and to form a first aerial image thereof, a second telecentric system aligned with said first telecentric system and consisting of third and fourth positive lenses separated from each other a distance equal to the sum of their respective focal legnths, said second telecentric system being arranged to receive light from said first aerial image and to form a second aerial image thereof, and a projection objective optically aligned with said second telecentric system and arranged to receive light from said second aerial image and to project an enlarged image thereof onto said viewing screen, said second positive lens of the first telecentric system and said third positive lens of said second telecentric system being contained in common mounting means and together forming a telescopic optical system adapted to provide a predetermined magnification for the projected image of said work piece on said screen, and said common mounting means containing said second and third positive lenses being reversible as a unit in said relay system so as to function as a telescopic optical system of different power while still functioning in said relay system as components of said first and second telecentric optical systems and yielding a different predetermined magnification for the projected image on said screen.

References Cited in the file of this patent
UNITED STATES PATENTS

| | | |
|---|---|---|
| 1,236,722 | Lange | Aug. 14, 1917 |
| 1,445,284 | Bell et al. | Feb. 13, 1923 |
| 2,552,238 | Turner et al. | May 8, 1951 |
| 2,737,849 | Tiller | Mar. 13, 1956 |
| 2,899,862 | Baker | Aug. 18, 1959 |